R. J. CLAY.
Improvement in Toys for Producing a Crying Sound.
No. 122,707.   Patented Jan. 16, 1872.
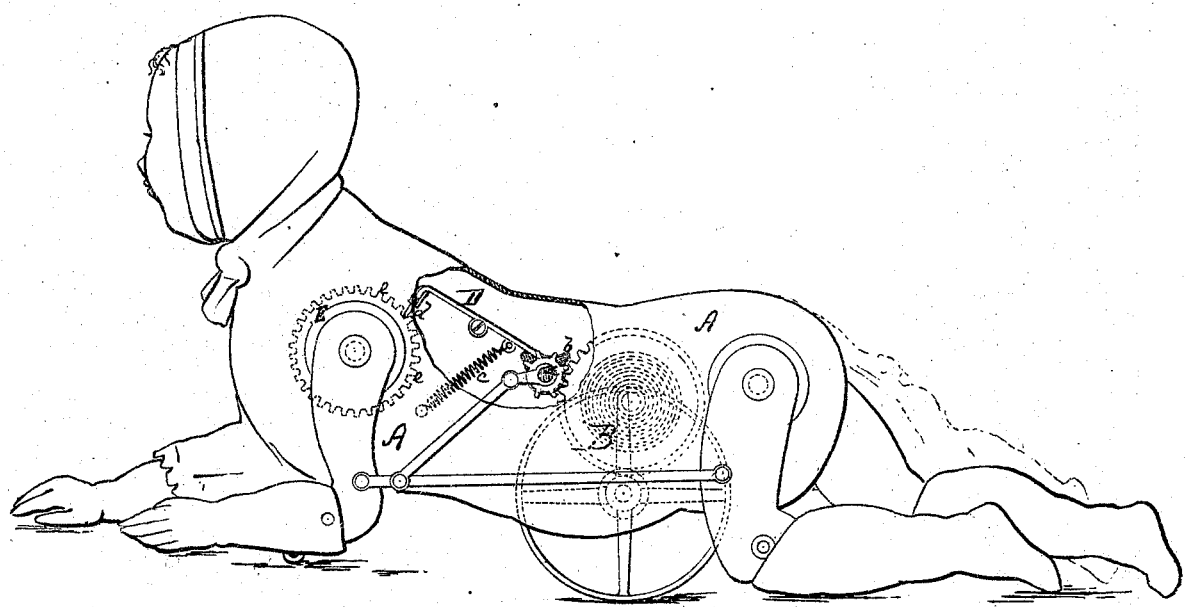
Witnesses.   Inventor
Gustave Dieterich
Francis McArdle
pr. R. J. Clay
Attorneys.

UNITED STATES PATENT OFFICE.

ROBERT J. CLAY, OF NEW YORK, N. Y., ASSIGNOR TO HIMSELF AND TASKER H. MARVIN, OF SAME PLACE.

IMPROVEMENT IN TOYS FOR PRODUCING A CRYING SOUND.

Specification forming part of Letters Patent No. 122,707, dated January 16, 1872.

*To all whom it may concern:*

Be it known that I, ROBERT J. CLAY, of New York city, in the county of New York and State of New York, have invented a new and Improved Speaking Toy; and I do hereby declare that the following is a full, clear, and exact description thereof, which will enable others skilled in the art to make and use the same, reference being had to the accompanying drawing forming a part of this specification.

The drawing represents a sectional side view of my invention.

This invention relates to improvements in creeping, or perambulating, or other toys, provided with clock-work for suitable purpose; and consists in the application to such clock-work of certain devices whereby sounds in imitation of the human or animal voice are produced.

A in the drawing represents the toy, of suitable kind. B is the clock-work contained in it for propelling or otherwise operating it. Upon one of the spindles $a$ I mount a cam, $b$, which, in connection with a spring, $c$, serves to impart oscillating motion to a lever, D, that is pivoted to the frame or casing of the toy. The end of the lever D carries a projecting blade, $d$, of rubber, pasteboard, or other equivalent material. During the oscillations of the lever this blade $d$ is alternately held against and carried off the edge of a toothed wheel, E, which is rapidly rotated by the clock-work with which it is connected. Whenever the teeth of the wheel $e$ strike the elastic blade $d$ in rapid succession, a sound is produced composed of the series of strokes, in imitation of the crying of a child, or of an animal voice. By varying the nature of the blade $d$, the nature of the sound will also be varied; thus, by the combination of the wheel $e$ with the blade on the vibrating lever, various sounds can be imitated.

Having thus described my invention, what I claim as new, and desire to secure by Letters Patent, is—

The combination of the rotating wheel E with the blade $d$ on the oscillating lever D, substantially as and for the purpose herein shown and described.

ROBERT J. CLAY.

Witnesses:
T. B. MOSHER,
GEORGE W. MABEE.